United States Patent [19]
Clausen et al.

[11] Patent Number: 5,997,739
[45] Date of Patent: Dec. 7, 1999

[54] FUEL/WATER SEPARATOR

[75] Inventors: Michael D. Clausen, Turlock; Kenneth R. Duncan, Ripon, both of Calif.

[73] Assignee: Parker-Hannifin Corporation, Cleveland, Ohio

[21] Appl. No.: 09/061,448

[22] Filed: Apr. 16, 1998

[51] Int. Cl.[6] .................................................... C02F 1/40
[52] U.S. Cl. .................... 210/232; 210/305; 210/307; 210/438; 210/532.1; 210/DIG. 5
[58] Field of Search .................................... 210/232, 299, 210/305, 307, 438, 521, 532.1, 540, DIG. 5

[56] References Cited

U.S. PATENT DOCUMENTS

| | | |
|---|---|---|
| 2,872,043 | 2/1959 | Fitzgerald et al. . |
| 3,227,280 | 1/1966 | Hathaway et al. ...................... 210/438 |
| 3,228,527 | 1/1966 | McPherson ........................ 210/DIG. 5 |
| 3,591,580 | 7/1971 | Winterhalter et al. . |
| 3,785,970 | 1/1974 | Hodgkins . |
| 4,057,496 | 11/1977 | Itagaki . |
| 4,372,847 | 2/1983 | Lewis ............................... 210/DIG. 5 |
| 4,561,977 | 12/1985 | Sasaki . |
| 4,592,838 | 6/1986 | Christophe et al. . |
| 4,626,348 | 12/1986 | Stone . |
| 4,692,245 | 9/1987 | Church et al. . |
| 4,976,852 | 12/1990 | Janik et al. . |
| 5,244,571 | 9/1993 | Church et al. . |
| 5,417,848 | 5/1995 | Ermunnsdörfer et al. .............. 210/232 |
| 5,643,446 | 7/1997 | Clausen et al. . |
| 5,665,239 | 9/1997 | Bradford ................................ 210/305 |
| 5,788,859 | 8/1998 | Piere ....................................... 210/438 |

*Primary Examiner*—Christopher Upton
*Attorney, Agent, or Firm*—Christopher H. Hunter

[57] ABSTRACT

A spin-on element includes a cylindrical housing, a tap plate at one end of the housing, and an adapter ring supported by and bounding the other end of the housing. A collection bowl can be threadably attached to the adapter ring. An imperforate inner support tube in the housing fluidly separates a central opening in the tap plate from peripheral openings. The inner tube has an inner surface defining a central chamber in fluid communication with the central opening. A perforated outer support tube surrounds the inner support tube, and has an outer surface defining a peripheral chamber in the housing. The inner and outer support tubes together define an intermediate chamber, in fluid communication with the peripheral openings in the tap plate. A nylon water coalescing mesh surrounds the outer support tube, and is curled over the ends of the outer tube. A first end cap comprising a foam gasket with openings to allow fluid to enter the intermediate chamber is disposed at one end of the support tubes. A second end cap with a central opening supports the other ends of the tubes and is supported on said adapter ring. A peripheral flow path is defined between the periphery of the second end cap and the housing and internally of the adapter ring, the peripheral flow path allowing fluid communication between the peripheral chamber and the central chamber. Water in the fluid coalesces on the media surrounding the outer support tube and drains down into the collection bowl.

27 Claims, 4 Drawing Sheets

FUEL/WATER SEPARATOR

FIELD OF THE INVENTION

The present invention relates generally to a separator for removing immiscible liquid impurities from a suspension, and more particularly to a water separator element for removing suspended particles of water from a petroleum-based liquid fuel.

BACKGROUND OF THE INVENTION

Water may be entrained in petroleum-based liquid fuel as free water suspended in droplet or particulate form, in emulsion, or in solution. Dissolved water in fuel is common and generally presents little difficulties for operation of particulate filters for the fuel, as long as the water remains uniformly distributed in the fuel. The capacity of fuel to hold water in solution changes as a result of temperature changes, and in many cases, the finely-divided water particles will coalesce into larger particles in an undissolved state, which settle out because their density is greater than the fuel. Particulate fuel filters, frequently being formed from paper, degrade as the pores of the paper become clogged with the undissolved water, which can increase the pressure drop across the filter.

It is therefore important to remove the undissolved water particles suspended in the fuel before the fuel passes through any filter medium for removing solid particulate contaminants. The removal of water from the fuel system also prevents filter and fuel line freeze up.

It is also important that a water separator for a fuel supply system for a diesel engine pass solid particles of a larger size than the droplets of the water to be removed. Under some low temperature conditions when the suspended droplets of water are removed from the fuel by freezing, wax components of the diesel fuel coagulate and may form wax particles. It is important that the water separator pass such particles to prevent clogging of the separator and consequently, engine stalling.

One early type of water separator shown in U.S. Pat. No. 3,785,970, where a nylon sock had its open end sealed around the inlet passage to the separator so that the flow of fuel through the sock maintain the sock in an inflated condition. Using a nylon sock, there is an uniform minimal pressure drop across the entire porous surface of the sock. The pores of the sock are expandable to reach a state of equilibrium in which pores are of a size to create the pressure drop required to accommodate the established flow rate of fuel. The expandability of the pores also permits the passage of filterable particulate matter suspended in the fuel so that the water separator is not clogged by large wax particles of fuel under low-temperature operating conditions.

While the water separator shown in the '970 patent has certain satisfactory qualities, the water separator has certain limitations as to structure and application, and was not particularly suited for a spin-on capability with a replaceable transparent collection bowl, to allow the separator to be easily attached to and detached from a manifold head, and to visually inspect the level of water in the separator element. Such spin-on types of elements with collection bowls have received wide-spread acceptance in the marketplace and consumers are generally comfortable and knowledgeable about their use and application.

It is also believed there is a constant demand in the industry for new and improved water separators, particularly water separators which incorporate few components, are easy to assemble, and which provide efficient separation of water from a water/fuel mixture.

SUMMARY OF THE PRESENT INVENTION

The present invention relates to a new and unique water separator for separating water from a water/liquid mixture, and particularly a water separator element which separates water particles from a water/fuel mixture. The water separator has spin-on capability and includes a collection bowl to easily visually inspect the accumulation of water in the element. The separator is also easy to assemble, has few parts, and efficiently separates the water from the water/fuel mixture.

According to the preferred form of the present invention, the water separator includes a cylindrical metal housing with a tap plate at one end of the housing, and a adapter ring at the other end of the housing. The adapter ring is supported by an in-turned annular lip at the lower end of the housing, and includes internal threads to allow attachment of a transparent collection bowl. The tap plate includes a central threaded opening to allow the tap plate to be threadably received on a manifold head, and an annular array of peripheral openings spaced radially outward from the central opening.

An imperforate inner support tube is disposed in the housing and fluidly separates the central opening in the tap plate from the peripheral openings. The inner tube has an inner surface defining a central chamber in fluid communication with the central opening. A perforated outer support tube surrounds the inner support tube, and has an outer surface defining a peripheral chamber in the housing. The outer surface of the inner support tube, and the inner surface of the outer support tube, together define an intermediate chamber, which is in fluid communication with the peripheral openings in the tap plate. A nylon coalescing mesh surrounds the outer surface of the outer support tube, and preferably is retained thereon by being curled over the ends of the support tube.

A first end cap comprising an annular foam gasket is disposed between the upper ends of the support tubes and the tap plate. The first end cap provides a fluid-tight seal between the upper end of the support tubes, as well as between the tap plate and the support tubes. The first end cap may be adhesively secured to the tap plate, although compressive forces may retain the end cap satisfactorily to the tap plate. The first end cap includes a series of arcuate openings to allow liquid to flow through the peripheral openings in the tap plate into the intermediate chamber between the support tubes.

A second, plastic end cap supports and is adhesively sealed to the lower ends of the support tubes. The second end cap has an annular imperforate portion which provides a fluid seal between the lower end of the support tubes. The second end cap includes a central opening, and a series of radial ribs on its lower surface which support the end cap on the adapter ring at the lower end of the housing. The ribs also provide a flow path between the second end cap and the adapter ring.

The water/fuel mixture directed through the peripheral openings in the tap plate flows into the intermediate chamber between the support tubes, and then radially outward through the outer perforated tube and the nylon mesh. Water in the mixture coalesces on the outer surface of the nylon mesh, and drips down, through the flow path defined by the ribs, internally of the adapter ring, and into the attached collection bowl, where the water level can be visually inspected, and the collection bowl removed and drained when necessary. The fuel in the mixture also passes outward through the mesh into the peripheral chamber, and then downward through the flow path between the ribs, internally of the adapter ring, and then upwardly through the central opening in the second end cap to the central chamber in the housing. The water-free fuel then flows out through the central opening in the tap plate to the manifold head.

As such, as described above, the present invention provides a novel and unique water separator which is inexpensive, has spin-on capability and includes a collection bowl to easily visually inspect the accumulation of water in the element. The separator is also easy to assemble, has few parts, and efficiently separates the water from the water/fuel mixture, or in a broader sense, immiscible liquid impurities from a suspension.

Further features of the present invention will become apparent to those skilled in the art upon reviewing the following specification and attached drawings.

DETAILED DESCRIPTION OF THE PREFERRED EMBODIMENT

Figure 1:
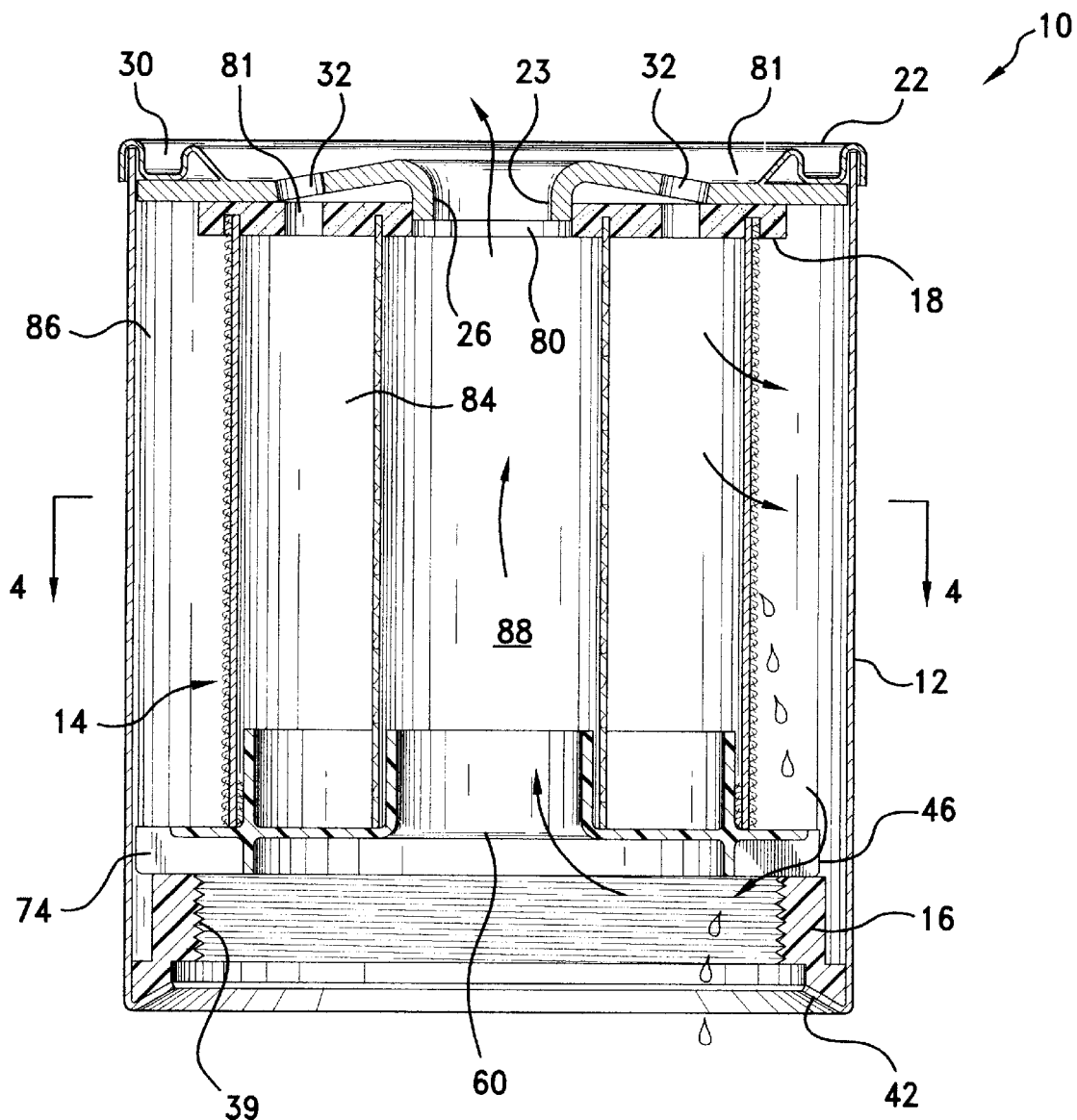
FIG. 1 is a cross-sectional side view of a water separator constructed according to the principles of the present invention, shown without a collection bowl.
Figure 2:
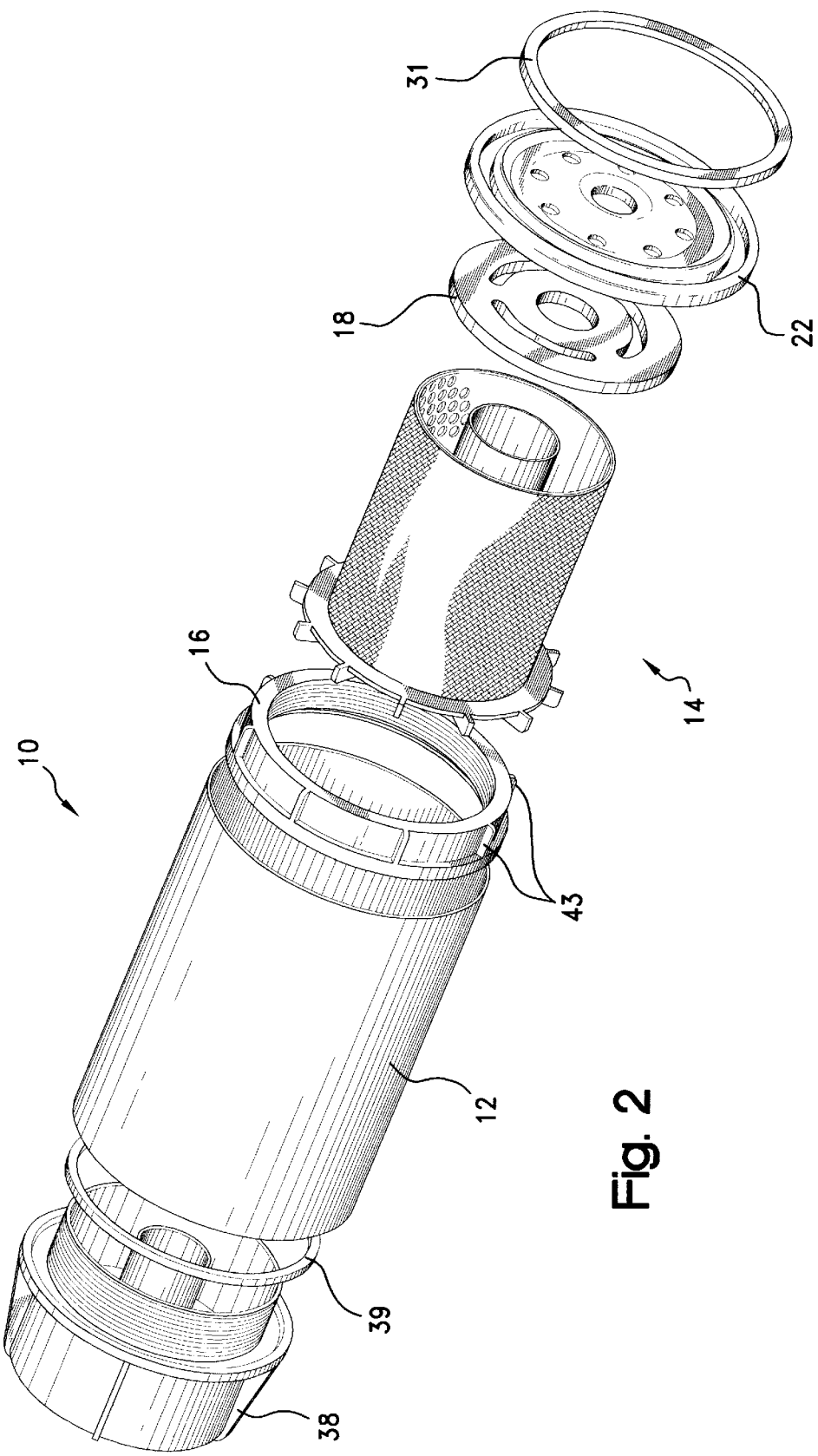
FIG. 2 is an elevated exploded perspective view of the various components of the water separator of the present invention.

Referring to the drawings, and initially to FIGS. 1 and 2, a water separator constructed according to the principles of the present invention is indicated generally at 10. The water separator 10 includes an outer metal cylindrical housing 12 which encloses an element subassembly, indicated generally at 14, a ring-shaped adapter 16 at the lower end of the element subassembly, and a first end cap 18 at the upper end of the element subassembly.

A metal tap plate 22 encloses the upper end of the housing 12. Tap plate 22 has a circular configuration and includes an in-turned annular flange 23 which defines a central opening 24 along the geometric axis of the housing. Flange 23 includes inwardly-directed threads to allow the water separator 10 to be connected to and disconnected from, a threaded spud of a manifold head (not shown). The spud includes a central bore providing an outlet flow path from the water separator. The outer edges of the tap plate 22 are fixed in a conventional, fluid-tight manner to the walls of housing 12. An outwardly-directed groove 30 is formed in the tap plate which is designed to receive a resilient annular gasket 31 to fluidly seal tap plate 22 to the manifold head. The tap plate further includes an annular array of peripheral openings 32 spaced evenly around the tap plate, and spaced radially-outward from the central opening 23. Peripheral openings 32 receive an inlet flow stream from the manifold head. Such a tap plate is a common feature in many spin-on types of elements. Resort may had to U.S. Pat. No. 5,244,571, also owned by the assignee of the present invention, which shows such a tap plate and associated structure.

The adapter ring 16 for the water separator is preferably formed from a rigid, high strength material such as plastic, and includes an annular threaded portion 36 with inwardly-directed threads for securement of a bowl-shaped, transparent plastic collection bowl 38. A resilient annular gasket 39 provides a fluid-tight seal between the adapter ring and the collection bowl. Adapter ring 16 is supported by an annular in-turned lower end of the housing, as indicated at 42. Housing 12 can be formed inwardly in any appropriate manner, such as by crimping or rolling. Resort may again be had to U.S. Pat. No. 5,244,571, which describes a similar adapter ring supported by the housing in this manner. A plurality of radially-outward projecting ribs 43 (FIG. 2) on adapter ring 16 provide a close fit between the ring and the housing 12 such that the ring is rigidly fixed within the housing.

Figure 4:
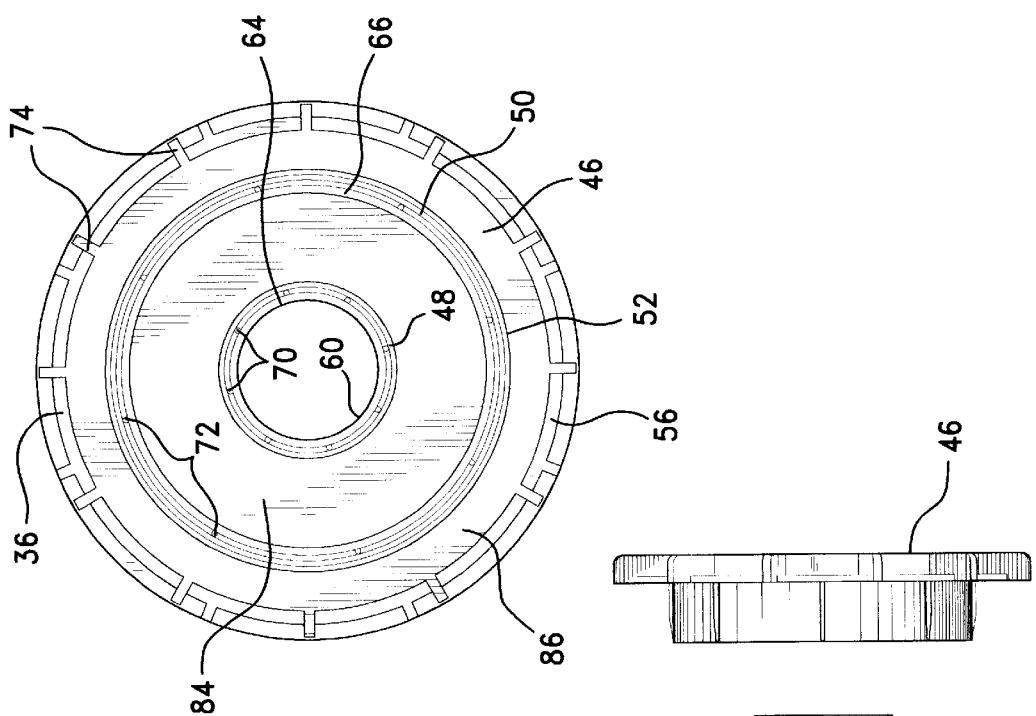
FIG. 4 is a cross-sectional end view of the water separator taken substantially along the plane defined by the lines 4—4 of FIG. 1.
Figure 3:
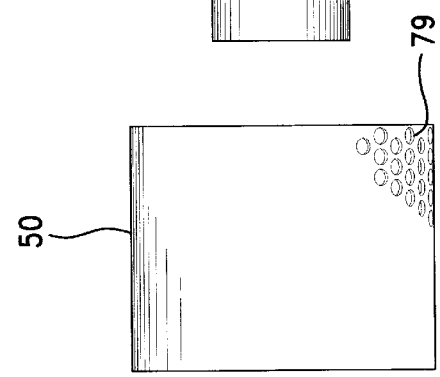
FIG. 3 is a side exploded view of the various components of the element subassembly for the water separator.
Figure 3:
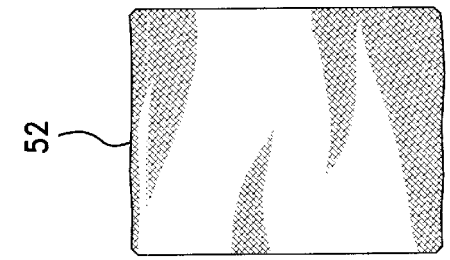
Figure 5:
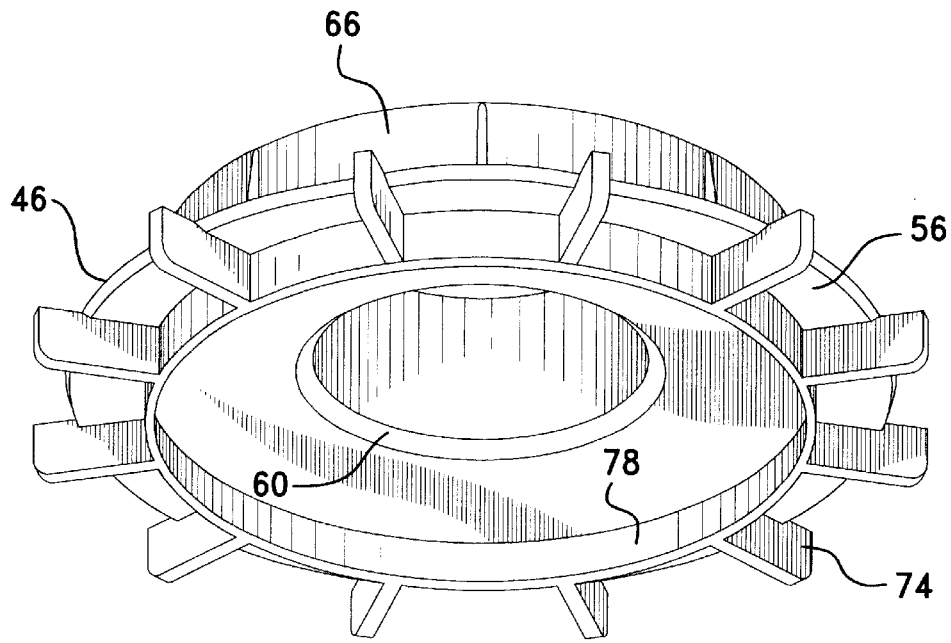
FIG. 5 is a lower perspective view of the lower end cap for the element subassembly of FIG. 3.
Figure 6:
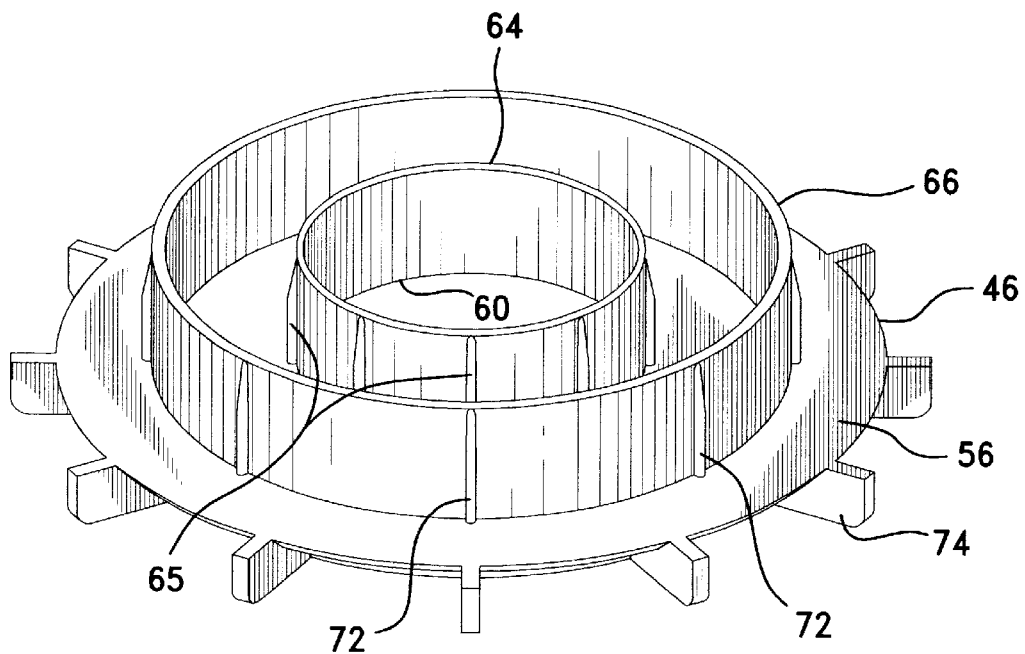
FIG. 6 is an elevated perspective view of the lower end cap.

Referring now to FIG. 3, the element subassembly 14 includes a second end cap 46 supporting the lower end of an inner, imperforate support tube 48; an outer, perforated support tube 50; and a ring of coalescing media 52. Referring also to FIGS. 4–6, the second end cap 46 is also preferably formed in one-piece from a rigid, high-strength material, such as plastic, and includes a flat annular imperforate portion 56 which bounds a central circular opening 60. A first, inner cylindrical portion 64 bounds opening 60 and projects axially away from the flat upper surface of the annular portion 56. A series of radially-outward projecting spines 65 are formed on inner cylindrical portion 64. A second, outer cylindrical portion 66 is spaced radially outward from the first cylindrical portion 64, and also projects axially away from the upper surface of annular portion 56. A plurality of radially-outward projecting spines 72 are also formed on outer cylindrical portion 66. The reasons for spines 65 and 72 will be explained more fully below.

Second end cap 46 further includes a plurality of radially-oriented and circumferentially-distributed upstanding ribs 74 evenly spaced around the flat lower surface of the annular portion 56. Ribs 74 are inwardly-bounded by a ring 78 which provides support for the ribs and flow control, as will be described herein. As shown in FIG. 1, ribs 74 extend radially outward beyond the periphery of the annular portion 56 of the second end cap, and are closely received within housing 12. Ribs 74 support lower end cap 46 on the upper annular end of adapter ring 16, and well as provide discrete flow paths between the housing 12 and the lower end cap 46 and adapter ring 16.

While the present invention is illustrated as having lower end cap 46 and adapter ring 16 formed as two separate pieces, it is also within the scope of the invention that these pieces could be formed together as a single unitary member.

Referring again to FIG. 3, inner imperforate support tube 48 is preferably a cylindrical tube formed from cardboard, phenolic-impregnated cellulose, or other light-weight, inexpensive material. Inner tube 48 is closely received about inner cylindrical portion 64 of lower end cap 46, with spines 70 providing a fluid-tight interference fit between the cylindrical portion and the tube. If necessary or desirable, a common adhesive can be used to further secure the inner support tube 48 to lower end cap 46.

Outer perforated support tube 50 is likewise a cylindrical tube and is formed from a light-weight metal or other rigid, inexpensive material. Outer tube 50 includes a plurality of openings, as at 79, evenly-distributed around the tube. The number, spacing and dimensions of openings 79 is generally chosen so as to provide a strong outer support, yet minimize pressure drop across the tube. Outer support tube 50 is likewise closely received about the outer cylindrical portion 66 of lower end cap 46, with spines 72 providing a fluid-tight interference fit between the outer cylindrical portion and the outer support tube. Common adhesive can also be used to further secure the outer support tube 50 to the lower end cap 46. The inner and outer cylindrical portions 64, 66 of lower end cap 46 should be long enough to allow easy assembly of the inner and outer support tubes around the cylindrical portions and provide a secure, fluid-tight fit with the support tubes, but should be short enough so as to not significantly effect the pressure drop across the element subassembly.

The water coalescing media 52 for element subassembly 14 preferably takes the form of a ring of porous cloth or mesh having, when relaxed, small pores which are readily expandable to pass wax particles entrained in fuel. The media preferably comprises a woven cloth sock formed from nylon. It has been found that a nylon sock results in a barrier which produces a positive but minimal drop resisting the flow of liquid fuel between the upstream and downstream sides of the sock and the oozing of the fuel through the pores. This positive slowing of the flow allows gravity to act in settling out some of the water particles and solid contaminants of all sizes. Moreover, this construction, coupled with the elasticity of the sock, automatically causes the pores of the sock to reach a size, in the equilibrium state, which is the minimum size which will allow the passage of fuel at the required flow rate. The elasticity of the sock also allows the pores to expand sufficiently to pass large wax particles during cold temperature operation. Further discussion on the coalescing action of such a nylon media can be found in U.S. Pat. No. 3,785,970.

The preferred embodiment of the coalescing media is a nylon knit fiber, referred to as 6—6 Nylon fiber, which has been found well suited for use in removing suspended water particles from fuel oil for diesel engines. Nylon knit appropriate for the coalescing media is commercially-available from a number of sources. The nylon coalescing media 52 can be easily fitted over the outer support tube 50 in surface-to-surface contact therewith, a small portion of the ends of the media wrapped around the ends of the outer support tube, and disposed in contact with the inside surface of the tube. The lower end of the coalescing media is fixed to the outer support tube when the outer support tube is received around the cylindrical portion of the second lower end cap 46.

The upper end cap 18 supports the upper ends of the inner and outer support tubes 48, 50, as well as the upper end of the coalescing media 52. The upper end cap has an annular configuration defining a central circular opening 80. Preferably, the upper end cap 18 is a closed-cell foam gasket. The gasket is compressed between the upper tap plate 22 and the upper ends of the support tubes and the coalescing media when the water separator is assembled. While the compressive forces are preferably sufficient to support the support tubes and the coalescing media and provide a fluid-tight seal with the tap plate 22, an appropriate adhesive can also be used. The foam gasket 18 includes a series of arcuate openings 81, which allow fluid directed into the peripheral openings 32 of upper tap plate 22 to be directed into the separator housing. The number, dimension and spacing of the openings 81 in the foam gasket 18 will depend upon the particular application, and should minimize the pressure drop across the gasket.

When the separator is to be assembled, the adapter ring 16 is first inserted within housing 12, and the lower end of the housing is formed as at 42 to fix the adapter ring to the housing. Next, the element subassembly 14 is inserted into the housing, with lower end cap 46 supporting the assembly on the adapter ring 16. The element subassembly, with lower end cap 46, inner and outer support tubes 48, 50 and coalescing media 52 can be pre-assembled before the remainder of the separator is assembled. The upper end cap 18 is then inserted into the housing, and upper tap plate 22 is then fixedly attached to the housing to enclose the above-described components, compressing the foam gasket 18 between the support tubes 48, 50, and the tap plate 22.

When the components are assembled as above, the openings 81 in the foam gasket 18 are fluidly-aligned with openings 32 in upper tap plate 22, and fluid (a water/fuel mixture) is directed into openings 32 into an intermediate chamber 84 defined between the inner support tube 48 and the outer support tube 50. The fluid can then flow radially outward through perforated outer support tube 50. The fluid then flows through the surrounding water coalescing media 52 into a peripheral chamber 86 defined between the outer surface of the coalescing media and the inner surface of the housing. Water in the mixture is prevented from passing through the coalescing media, and generally collects on the downstream surface, where when the water forms droplets of a large enough size, the droplets then drain downwardly along the media, and then through the flow path defined between the ribs 74 on the lower end cap, and between the adapter ring 16 and the annular portion 56 of the lower end cap. The water droplets, being generally heavier than fuel, drain downwardly through the fuel into the collection bowl. The water is collected in the chamber of the collection bowl 38, which can be visually inspected and removed and drained when necessary.

The fuel in the mixture also flows into the peripheral chamber 86, and then downwardly between the ribs 74 and between the adapter ring 16 and the lower end cap 46. The fuel then passes upward through opening 60 in the lower end cap 46 and to a central chamber 88 of the housing, defined inwardly of the inner support tube 48. The flow is then directed through the central opening 80 in the foam gasket 18, and the central opening 23 in the upper tap plate 22. The flow is then directed into the spud of the manifold head. The water-free fuel can then pass on to downstream components in the system.

During cold temperature operation, any wax in the fuel which clogs the nylon coalescing media 52 will be allowed to pass as the pressure on the downstream side of the media increases, thereby increasing the pore size of the media. Once the fuel warms up, the wax generally returns to solution within the fuel.

As described above, the present invention provides a novel and unique water separator which has spin-on capability and includes a collection bowl to easily visually inspect the accumulation of water in the element. The separator is also easy to assemble, has few parts, and efficiently separates the water from the water/fuel mixture, or in a broader sense, immiscible liquid impurities from a suspension.

While the present invention has been particularly described above in connection with the removal of suspended particles of water from a petroleum-based liquid, such as fuel oil, it may also have other application for the removal of liquid impurities from other suspensions.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An element for separating water from a water and fuel mixture, comprising:
   a cylindrical housing;
   a tap plate enclosing one end of the housing, said tap plate including a threaded tap plate opening along the central axis of the housing, and at least one peripheral opening spaced radially outward from said central opening;
   an adapter ring bounding another end of the housing, said adapter ring supported internally in the housing by an in-turned annular lip of the housing, said adapter ring including attachment threads to allow a collection bowl to be attached to the housing;
   an imperforate inner support tube disposed within the housing fluidly separating the central opening in the tap plate from the at least one peripheral opening, the inner support tube having an inner surface defining a central chamber in the housing in fluid communication with the central opening in the tap plate;
   a perforated outer support tube disposed within the housing radially outward from the inner support tube, the outer support tube having an outer surface defining with the housing a peripheral chamber, the inner surface of the outer support tube and the outer surface of the inner support tube defining an intermediate chamber, the intermediate chamber in fluid communication with the at least one peripheral opening;
   a ring of water coalescing media surrounding the outer support tube; and
   a second end cap with a central opening supported on said adapter ring, said second end cap having an annular imperforate portion supporting one end of each of said support tubes, a flow path defined between the periphery of the second end cap and the housing, the flow path allowing fluid communication between the peripheral chamber and the central chamber of the housing through the central opening in the second end cap and fluid communication between the peripheral chamber and an attached collection bowl, wherein the fuel mixture directed in through the peripheral openings in the tap plate and into the intermediate chamber passes radially outward through the perforated outer tube and water in the fuel coalesces on the coalescing media surrounding the tube and drains into the attached collection bowl, while the water-free fuel in the mixture flows through the central opening in the second end cap, into the central chamber, and is directed out through the central opening in the tap plate.

2. The element as in claim 1, wherein said coalescing media is a flexible sock.

3. The element as in claim 2, wherein said coalescing media is disposed in surface-to-surface contact with the outer surface of said outer support tube, and includes end portions which are folded around the ends of the outer support tube and disposed against the inner surface of the outer support tube.

4. The element as in claim 3, wherein said coalescing media is a nylon mesh or cloth media.

5. The element as in claim 1, wherein both of said support tubes are adhesively bonded to said second end cap.

6. The element as in claim 1, wherein said second end cap further includes a series of radially-projecting ribs supporting the imperforate annular portion on said adapter ring, the flow path further being defined between said ribs.

7. The element as in claim 1, wherein said second end cap further includes an inner cylindrical portion and an outer cylindrical portion, said inner and outer cylindrical portion projecting axially upward from said second end cap, said inner cylindrical portion closely receiving the inner support tube, and the outer cylindrical portion closely receiving the outer support tube.

8. The element as in claim 1, further including a first end cap supporting another end of each of said support tubes, said first end cap fluidly sealed to said tap plate and including a flow passage fluidly communicating the at least one peripheral passage in the tap plate with the intermediate chamber.

9. The element as in claim 8, wherein said first end cap comprises an annular foam gasket, said foam gasket being adhesively bonded to the tap plate.

10. A water separator element, comprising:
    a cylindrical housing;
    a tap plate enclosing one end of the housing, said tap plate including a tap plate opening along the central axis of the housing, and an annular array of peripheral openings spaced radially outward from said central opening;
    an adapter ring bounding another end of the housing, said adapter ring supported internally in the housing and including attachment threads;
    an imperforate inner support tube disposed within the housing fluidly separating the central opening in the tap plate from the at least one peripheral opening, the inner support tube having an inner surface defining a central chamber in the housing in fluid communication with the central opening in the tap plate;
    a perforated outer support tube disposed within the housing radially outward from the inner support tube, the outer support tube having an outer surface defining with the housing a peripheral chamber, the inner surface of the outer support tube and the outer surface of the inner support tube defining an intermediate chamber, the intermediate chamber in fluid communication with the peripheral openings;
    a ring of water coalescing media surrounding the outer support tube; and
    a second end cap with a central opening supported within the housing and having an annular imperforate portion supporting one end of each of said support tubes, a flow path defined between the periphery of the second end cap and the housing and internally of the adapter ring, the flow path allowing fluid communication between the peripheral chamber and the central chamber of the housing through the central opening in the second end cap.

11. The water separator element as in claim 10, wherein said coalescing media is a flexible sock.

12. The water separator element as in claim 11, wherein said coalescing media is disposed in surface-to-surface contact with the outer surface of said outer support tube, and includes end portions which are folded around the ends of the outer support tube and disposed against the inner surface of the outer support tube.

13. The water separator element as in claim 12, wherein the coalescing media is a nylon mesh or cloth media.

14. The water separator element as in claim 10, wherein both of said support tubes are adhesively bonded to said second end cap.

15. The water separator element as in claim 10, wherein said second end cap further includes a series of radially-projecting ribs supporting the imperforate annular portion on said adapter ring, the 1 flow path further being defined between said ribs.

16. The water separator element as in claim 10, wherein said second end cap further includes a an inner cylindrical portion and an outer cylindrical portion, said inner and outer cylindrical portion projecting axially upward from said second end cap, said inner cylindrical portion closely receiving the inner support tube, and the outer cylindrical portion closely receiving the outer support tube.

17. The water separator element as in claim 10, further including a first end cap supporting another end of each of said support tubes, said first end cap fluidly sealed to said tap plate and including a flow passage fluidly communicating the peripheral passages in the tap plate with the intermediate chamber.

18. The water separator element as in claim 17, wherein said first end cap comprises an annular foam gasket, said foam gasket being adhesively bonded to the tap plate.

19. A water separator element for separating water from a water/fluid mixture, comprising:

a cylindrical housing;

an end closure at an upper end of the housing, said end closure including an opening along the central axis of the housing, and at least one peripheral opening spaced radially outward from said central opening;

an imperforate inner support tube disposed within the housing fluidly separating the central opening in the end closure from the at least one peripheral opening, the inner support tube having an inner surface defining a central chamber in the housing in fluid communication with the central opening in the end closure;

a perforated outer support tube disposed within the housing radially outward from the inner support tube, the outer support tube having an outer surface defining with the housing a peripheral chamber, the inner surface of the outer support tube and the outer surface of the inner support tube defining an intermediate chamber, the intermediate chamber in fluid communication with the peripheral openings in the end closure;

a ring of water coalescing media surrounding the outer support tube; and a second end cap with a central opening supported toward a lower end of the housing and having an annular imperforate portion supporting a lower end of each of said support tubes;

a water collecting chamber in the housing beneath the second end cap; and a flow path allowing fluid communication between the peripheral chamber and the central chamber of the housing through the central opening in the second end cap, wherein when the water/fluid mixture is introduced into the intermediate chamber through the at least one peripheral opening in the end closure, the mixture can flow radially outward through the perforated support tube, and water in the mixture can coalesce on the coalescing media and drain down into the collecting chamber, while fluid in the mixture can flow through the central opening in the second end cap to the central chamber of the housing and out through the central opening in the end closure.

20. The element as in claim 19, wherein said coalescing media is a flexible sock.

21. The element as in claim 20, wherein said coalescing media is disposed in surface-to-surface contact with the outer surface of said outer support tube, and includes end portions which are folded around the ends of the outer support tube and disposed against the inner surface of the outer support tube.

22. The element as in claim 21, wherein said coalescing media is a nylon or cloth mesh media.

23. The element as in claim 19, wherein both of said support tubes are adhesively bonded to said second end cap.

24. The element as in claim 19, wherein said second end cap further includes a series of radially-projecting ribs supporting the imperforate annular portion within said housing, the flow path further being defined between said ribs.

25. The element as in claim 19, wherein said second end cap further includes an inner cylindrical portion and an outer cylindrical portion, said inner and outer cylindrical portion projecting axially upward from said second end cap, said inner cylindrical portion closely receiving the inner support tube, and the outer cylindrical portion closely receiving the outer support tube.

26. The element as in claim 19, further including a first end cap supporting another end of each of said support tubes, said first end cap fluidly sealed to said tap plate and including a flow passage fluidly communicating the at least one peripheral passage in the end closure with the intermediate chamber.

27. The element as in claim 26, wherein said first end cap comprises an annular foam gasket, said foam gasket being adhesively bonded to the end closure.

* * * * *